May 6, 1952     R. L. RHOADES     2,595,885
VENTILATION
Filed June 12, 1947
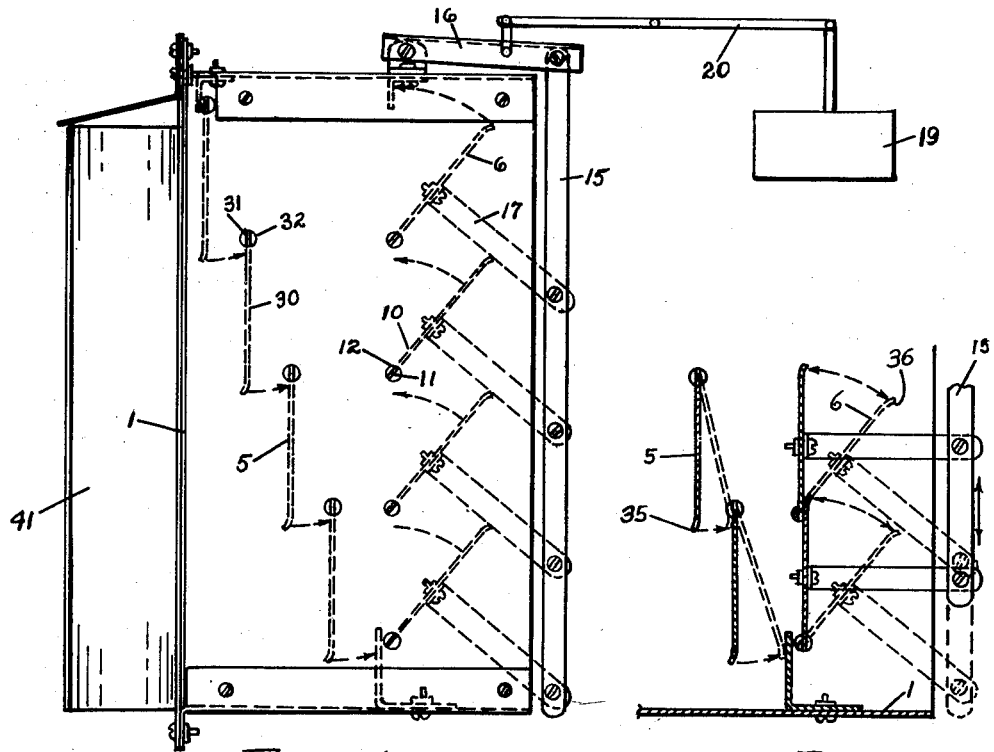
Fig. 1
Fig. 3
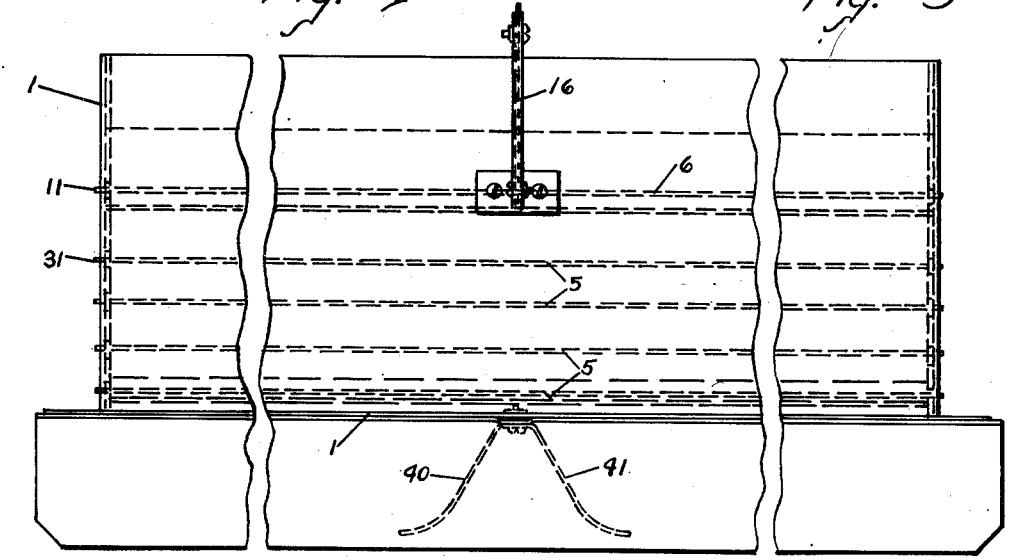
Fig. 2
Inventor
RAYMOND L. RHOADES
Gordon C. Mack
Attorney

Patented May 6, 1952

2,595,885

UNITED STATES PATENT OFFICE 2,595,885

VENTILATION

Raymond L. Rhoades, Barberton, Ohio

Application June 12, 1947, Serial No. 754,120

5 Claims. (Cl. 98—37)

This invention relates to a ventilator designed for use in poultry houses which term is used herein to include both brooders and laying houses.

Chickens, and more particularly young chicks, are very sensitive to changes in temperature. The rate of fatalities due to drafts in a brooder is high. Various devices have been placed on the market for regulating the temperature within a brooder but none has prevented drafts and drafts are what cause such severe damage and result in high fatalities.

The ventilator of the present invention includes temperature control means and in addition provides means for closing the opening or openings of the ventilator when any appreciable wind is blowing. The means for closing the opening to prevent drafts is automatic. When there is only gentle circulation of the air, ventilation is provided. Thus the ventilator of this invention includes temperature control means, in addition to providing ventilation and means for automatically shutting off the ventilation when there is any appreciable current of air entering the ventilator. The chicks in a brooder provided with one or more such ventilators are provided with ventilation but protected from drafts, and at the same time the temperature within the brooder is regulated automatically.

The ventilator of this invention includes any usual types of automatic temperature control. Thus, there are louvers which are controlled by a thermostat which opens them as the temperature rises and closes them as the temperature falls. The thermostat may also control the source of heat, as by supplying more or less gas to a burner as the temperature falls and rises. Any temperature control device may be utilized in connection with any automatic wind control device in the ventilator of this invention. Both types of control are located within a single ventilator. Thus, although the temperature control operates certain louvers, opening and closing them as the temperature rises and falls, other louvers are operated by the wind currents and shut off the ventilation whenever there is a sufficient wind current to produce inside of the brooder or other structure sufficient draft to do any damage.

The invention will be further described in connection with the accompanying drawings, in which Fig. 1 is an end view of the ventilator;

Fig. 2 is a plan view, and

Fig. 3 is a detail which illustrates the movement of the louvers.

Referring to the drawings, the ventilator comprises the frame or enclosing walls 1 of any usual construction. The frame is usually flanged to make a substantially air-tight union between the ventilator and the walls of the opening in which it is located. Within the frame or ventilator opening are two sets of louvers. The louvers 5 are operated by the wind. The louvers 6 are operated by any suitable thermostatic control. Thus the slant of the louvers 6 is controlled to regulate the amount of air which is admitted, and in this way controls the temperature within the structure. The louvers 5 on the other hand are spaced to provide ample room for ventilation but are so hung that when any appreciable air current is blowing against them they will close. In Fig. 1 the louvers 6 are located inside of the louvers 5 but this arrangement is not essential to the invention as the louvers 5 may be located inside of the louvers 6.

The louvers 6 which are operated by thermostatic control means each comprise a blade portion 10 and a rib 11 which extends the whole length of the bottom of the louver. The ends of the rib extend beyond the blade so as to form a pivot at each end of the louver which passes through a small opening 12 in the frame at each end of the ventilator. Thus the louver is free to pivot about the rib 11 and may be opened to any extent desired. It is to be understood that the rib 11 need not necessarily be at the bottom of the louver, since the structure shown is merely illustrative of what may be employed.

The vertical arm 15, pivotally hinged to the cross-arm 16, is connected with each of the louvers by means of the links 17. By moving the arm 15 or 16 down the louvers are opened; and moving either up closes the louvers. The thermostat 19 is connected through any suitable operating mechanism, illustrated by the pivotally supported lever 20, with arm 16, and movement of this arm is thus thermostatically controlled. Ordinarily the box 19 will be located at some distance from the ventilator. Whatever the arrangement, the opening and closing of the louvers 6 is controlled by the thermostat 19.

The louvers 5 may be of similar construction, comprising the blade 30 and the cross-rib 31 at the top thereof, which serves as a pivotal support, the ends of each rib passing through openings 32 in the ends of the ventilator. Each opening 32 is offset inwardly a slight distance from the opening 32 immediately above it. The distance between these openings 32 is somewhat less than the width of the louvers 30. Thus, as wind blows against the outside surface of the louvers 30, each is pivotally swung against the rib of the louver just below it, as illustrated in dotted lines in Fig. 3. The openings between the several louvers 5 are then closed and no air can enter between these louvers. Consequently no air enters the ventilator regardless of the position of the louvers 6. Fig. 3 also illustrates in dotted lines how these louvers 6 swing to the open position from the closed position shown in full lines. To prevent suffocation on a very windy night the louvers 5 may be perforated to admit a small amount of air even though they are closed, or there may be a small opening at the top or bottom of the ventilator to admit a small amount of air under all conditions. If ventilators such as described here are located on all sides of the brooder or other structure no such precautions are necessary because the wind never blows in all directions at the same time.

The louvers may be formed of any usual construction. They may be of metal. If made of transparent plastic the ventilator will serve as a window, as well as a ventilator. In the drawing the free edge of each louver is bent somewhat, simply in order to stiffen the louver blade. Thus, as indicated, the bottom of each of the blades 30 of the louvers 5 is bent outwardly at 35, and the top of each of the blades 10 of the louvers 6 is bent inwardly at 36.

A brooder or other structure may be equipped with one or more such ventilators. The temperature inside will be controlled automatically as is customary at the present time, because of the operation of the louvers 6 by the thermostat 19 and suitable connecting mechanism. The louvers 5 do not interfere with such automatic temperature control except when they remain closed for any considerable period of time, and the passage of air between the louvers 6 is thus entirely prevented. The operation of the louvers 5 is entirely independent of operation of the louvers 6 and is entirely automatic. The louvers 5 are so constructed and arranged that when any air currents arise outside the structure which are sufficient to produce a damaging draft within the structure due to currents of air passing into the structure through the ventilator, the louvers 5 will be swung closed. Their operation may be delicately adjusted as by proper weighting. The bottom of each louver may be weighted to retard closing. Alternatively, a weight may be located at the top of the louver and if located toward the inside of the building it will retard closing, but if located toward the outside of the building it will facilitate closing. Thus, by regulating the size of the louvers, the distance which one is offset from the one immediately above it, and by proper weighting, the louvers may be adjusted to close when a proper air pressure is exerted against them.

The air guides 40 and 41 are provided in order to direct a moderate flow of air into the ventilators. They may be formed by bending a single sheet of metal. Their purpose is to direct crosscurrents of air toward the louvers. Thus, although there may be no air blowing directly into the ventilator, these guides 40 and 41 may direct cross-currents through the ventilator to provide the ventilation which a chicken brooder requires.

The drawings are only illustrative. Modifications in the structure are possible without departing from the scope of the appended claims. Any suitable type of thermostat control may be provided. However, it is essential that the thermostatically-controlled ventilating means be located in the same opening as the breeze-operated means, so that the breeze-operated means will prevent circulation of air through the thermostatically-controlled ventilating means when more than a desired minimal current of air is flowing.

What I claim is:

1. A ventilator in a poultry house with a passage for the movement of air in and out of the same, louvers in the passage adapted to control the movement of air in the passage for temperature control purposes; other louvers located in the air passage and adapted to prevent the movement of air into the passage when closed, each of which other louvers is pivotally hung with the pivots spaced less than the width of the respective louvers, with each louver offset inwardly with respect to the louver next above it, whereby as wind blows inwardly into the passage the louvers are closed and on the cessation of blowing the louvers open so as to permit the passage of air between them, and means on the outside of the ventilator for directing air thereinto.

2. A poultry-house ventilator with an air passage therein, horizontal louvers in the passage pivoted to swing on a horizontal axis and thermostatically controlled means for operating the same, other horizontal louvers in the passage pivoted near the upper edge with the pivots for these respective louvers spaced less than the width of the louvers, with each louver offset inwardly with respect to the louver above it whereby wind blowing against the louvers closes them, the openings between the respective louvers of the two aforesaid sets of louvers being staggered so that no breeze can pass horizontally through the air passage.

3. A poultry-house ventilator, two sets of louvers therein, the louvers of each set being pivoted to swing horizontally, the pivots for the various louvers of the outer set being on substantially the same level as the pivots for the respective louvers of the inner set, the louvers of the outer set each being offset inwardly with respect to the louver above it and each louver being long enough to swing against the louver below it, each louver of the inner set being pivoted at its bottom edge with the louver pointing upwardly and adapted to swing inwardly, the inner louvers being connected with one another and with thermostatically controlled means for opening and closing them.

4. A poultry-house ventilator with a tortuous passage of air therethrough whereby a breeze will be caused to change direction in passing from the outer to the inner side thereof, said means including at least one horizontal louver pivoted at its upper edge, and means offset inwardly for the lower edge of the louver to close against; and other closure means in the passage to shut off the passage of air with thermostatic means for opening and closing the same, said other closure means being located in the path of an air current passing from the upper edge of said pivoted means directly through the air passage.

5. A poultry-house ventilator, an air passage therethrough with means for directing air which passes inwardly therethrough upward as it leaves the ventilator, which ventilator includes thermostatically controlled means for closing the passage and closure means held open by gravity and adapted to close when air circulates inwardly through the passage at more than a minimal rate said thermostatically controlled closure means and said other closure means being staggered whereby diversion from direct flow of air through the air passage is provided at each of said closure means.

RAYMOND L. RHOADES.

REFERENCES CITED

The following references are of record in the file of this patent:

UNITED STATES PATENTS

| Number | Name | Date |
|---|---|---|
| 227,586 | Sayers | May 11, 1880 |
| 518,984 | Zimmerman | May 1, 1894 |
| 532,452 | Elwell | Jan. 15, 1895 |
| 1,335,929 | Allen | Apr. 6, 1920 |
| 1,408,441 | Caldwell | Mar. 7, 1922 |
| 1,488,345 | Jenkins | Mar. 25, 1924 |
| 1,926,120 | Snediker | Sept. 12, 1933 |
| 2,194,878 | Tracy | Mar. 26, 1940 |
| 2,258,506 | Fisher | Oct. 7, 1941 |

FOREIGN PATENTS

| Number | Country | Date |
|---|---|---|
| 2,758 | Great Britain | 1886 |